US012634784B2

(12) United States Patent
    Hong

(10) Patent No.: US 12,634,784 B2
(45) Date of Patent: May 19, 2026

(54) METHOD AND APPARATUS FOR DETERMINING SATELLITE BACKHAUL INFORMATION

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 495 days.

(21) Appl. No.: 18/036,872

(22) PCT Filed: Nov. 16, 2020

(86) PCT No.: PCT/CN2020/129144
    § 371 (c)(1),
    (2) Date: May 12, 2023

(87) PCT Pub. No.: WO2022/099709
    PCT Pub. Date: May 19, 2022

(65) Prior Publication Data
    US 2023/0413142 A1     Dec. 21, 2023

(51) Int. Cl.
    *H04W 36/08*     (2009.01)
    *H04W 36/30*     (2009.01)
(52) U.S. Cl.
    CPC ......... *H04W 36/083* (2023.05); *H04W 36/30* (2013.01)
(58) Field of Classification Search
    CPC ............................ H04W 36/083; H04W 36/30
    See application file for complete search history.

(56) References Cited

U.S. PATENT DOCUMENTS

| | | | |
|---|---|---|---|
| 2020/0212998 A1* | 7/2020 | Sangireddi | ......... H04B 7/18582 |
| 2021/0385744 A1* | 12/2021 | Wu | ........................ H04W 48/20 |
| 2021/0392710 A1* | 12/2021 | Yang | ................... H04W 84/005 |

FOREIGN PATENT DOCUMENTS

| | | |
|---|---|---|
| CN | 110536482 A | 12/2019 |
| WO | WO 2020168840 A1 | 8/2020 |

OTHER PUBLICATIONS

European Patent Application No. 20961263.9, Search and Opinion Nov. 7, 2023, 12 pages.
3GPP "3rd Generation Partnership Project; Technical Specification Group Services and System Aspects; Study on architecture aspects for using satellite access in 5G (Release 16)", TR 23.737, Jun. 11, 2019; 39 pages.
PCT/CN2020/129144 English translation of International Search Report dated Jul. 30, 2021, 2 pages.

* cited by examiner

*Primary Examiner* — Justin Y Lee
(74) *Attorney, Agent, or Firm* — Cozen O'Connor

(57)     ABSTRACT

A method for determining satellite backhaul information includes: determining the satellite backhaul information corresponding to a terminal; in which the satellite backhaul information comprises any of the following information: information of whether the terminal is using a satellite backhaul, information of whether a network type of the satellite backhaul used by the terminal is changed, information of whether the terminal is located within a first cell; in which the first cell is a cell supporting the satellite backhaul, the terminal is located within a second cell, and whether the terminal is using the satellite backhaul depends on the second cell.

14 Claims, 6 Drawing Sheets sending a subscribe request for the satellite backhaul information to an SMF network element ⟩ 301 in response to obtained satellite backhaul information returned by the SMF network element, determining the satellite backhaul information currently corresponding to the terminal ⟩ 302 in response to the satellite backhaul information currently corresponding to the terminal indicating that the second cell where the terminal is currently located is using the satellite backhaul, determining a first QoS identifier currently corresponding to the terminal; or in response to the satellite backhaul information currently corresponding to the terminal indicating that the second cell where the terminal is currently located is not using the satellite backhaul, determining a second QoS identifier currently corresponding to the terminal ⟩ 303 determining the satellite backhaul information currently corresponding to the terminal ⟋101

FIG. 1 determining the satellite backhaul information currently corresponding to the terminal ⟋201 in response to the satellite backhaul information currently corresponding to the terminal indicating that the second cell where the terminal is currently located is using the satellite backhaul, determining a first QoS identifier currently corresponding to the terminal; or in response to the satellite backhaul information currently corresponding to the terminal indicating that the second cell where the terminal is currently located is not using the satellite backhaul, determining a second QoS identifier currently corresponding to the terminal ⟋202

FIG. 2 sending a subscribe request for the satellite backhaul information to an SMF network element ⟋301 in response to obtained satellite backhaul information returned by the SMF network element, determining the satellite backhaul information currently corresponding to the terminal ⟋302 in response to the satellite backhaul information currently corresponding to the terminal indicating that the second cell where the terminal is currently located is using the satellite backhaul, determining a first QoS identifier currently corresponding to the terminal; or in response to the satellite backhaul information currently corresponding to the terminal indicating that the second cell where the terminal is currently located is not using the satellite backhaul, determining a second QoS identifier currently corresponding to the terminal ⟋303

FIG. 3

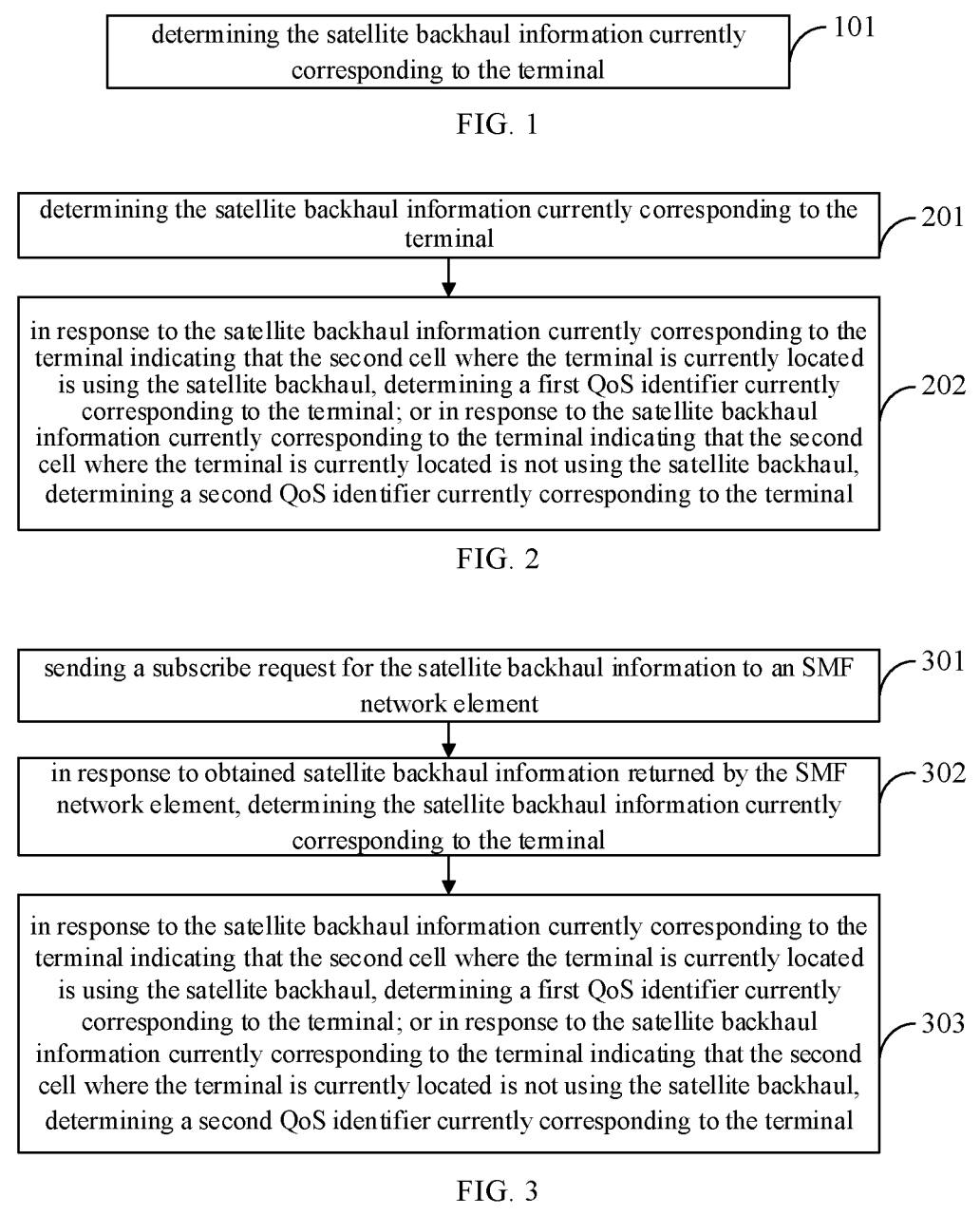

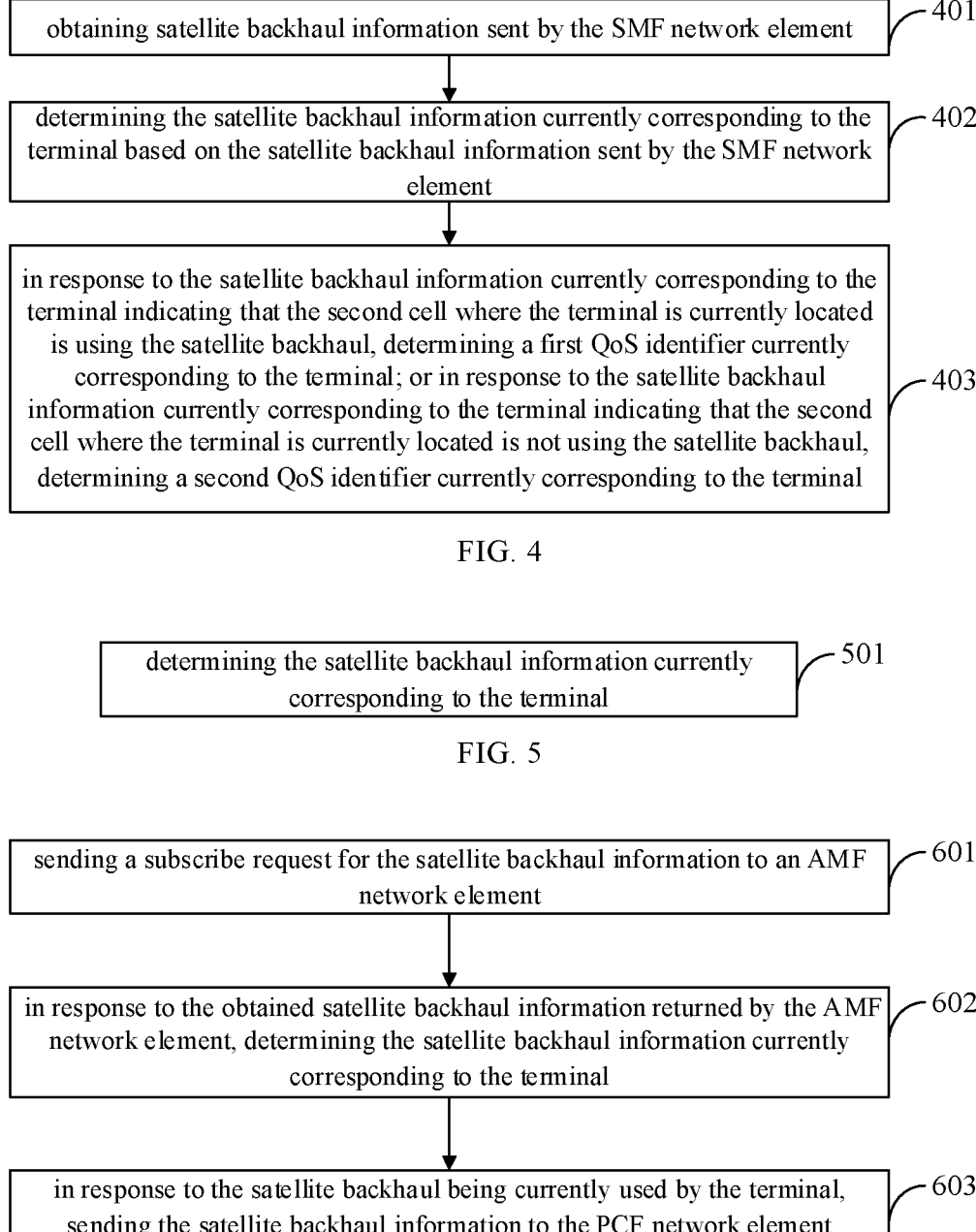

obtaining satellite backhaul information sent by the SMF network element — 401 determining the satellite backhaul information currently corresponding to the terminal based on the satellite backhaul information sent by the SMF network element — 402 in response to the satellite backhaul information currently corresponding to the terminal indicating that the second cell where the terminal is currently located is using the satellite backhaul, determining a first QoS identifier currently corresponding to the terminal; or in response to the satellite backhaul information currently corresponding to the terminal indicating that the second cell where the terminal is currently located is not using the satellite backhaul, determining a second QoS identifier currently corresponding to the terminal — 403

FIG. 4 determining the satellite backhaul information currently corresponding to the terminal — 501

FIG. 5 sending a subscribe request for the satellite backhaul information to an AMF network element — 601 in response to the obtained satellite backhaul information returned by the AMF network element, determining the satellite backhaul information currently corresponding to the terminal — 602 in response to the satellite backhaul being currently used by the terminal, sending the satellite backhaul information to the PCF network element — 603

FIG. 6

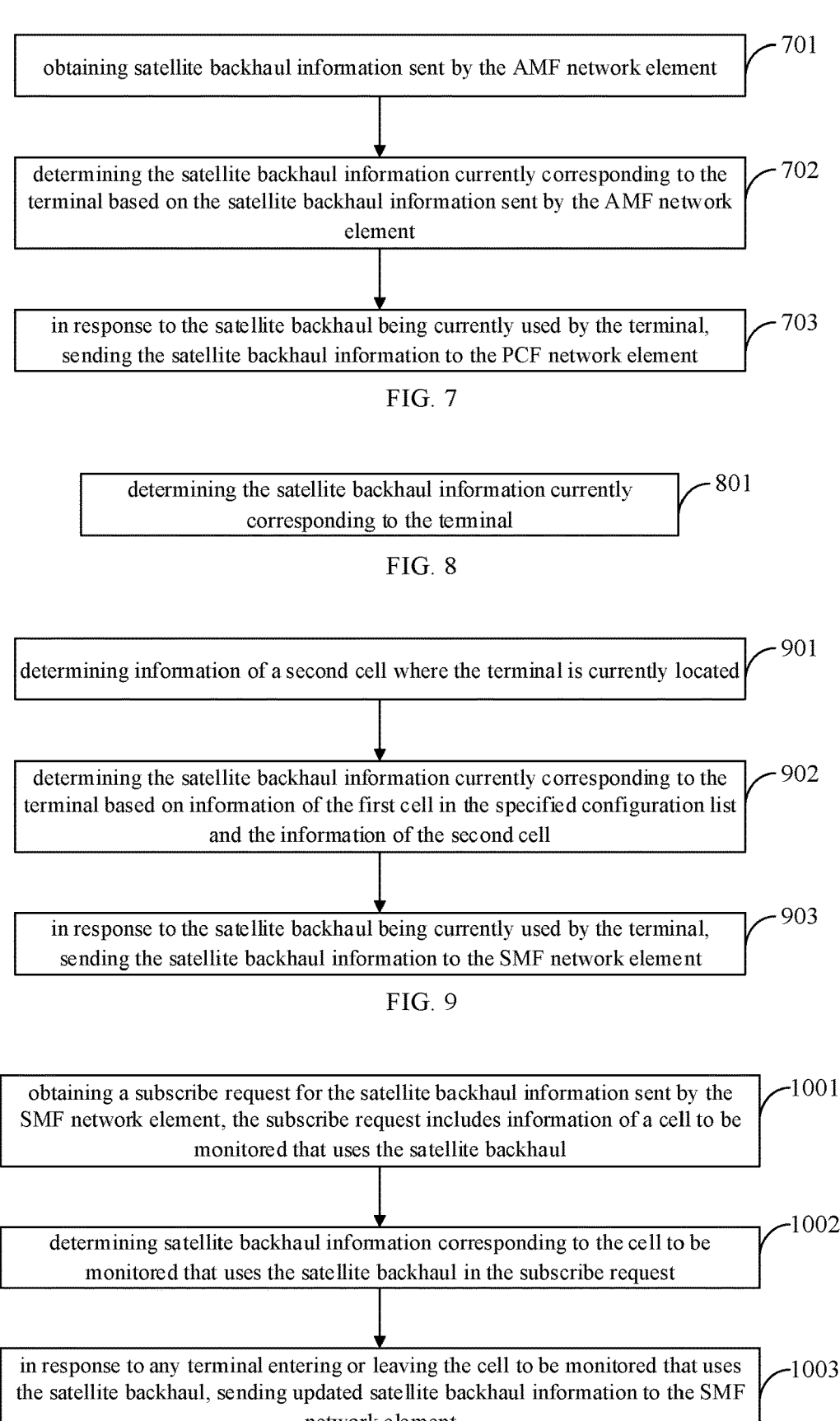

obtaining satellite backhaul information sent by the AMF network element        701 determining the satellite backhaul information currently corresponding to the terminal based on the satellite backhaul information sent by the AMF network element        702 in response to the satellite backhaul being currently used by the terminal, sending the satellite backhaul information to the PCF network element        703

FIG. 7 determining the satellite backhaul information currently corresponding to the terminal        801

FIG. 8 determining information of a second cell where the terminal is currently located        901 determining the satellite backhaul information currently corresponding to the terminal based on information of the first cell in the specified configuration list and the information of the second cell        902 in response to the satellite backhaul being currently used by the terminal, sending the satellite backhaul information to the SMF network element        903

FIG. 9 obtaining a subscribe request for the satellite backhaul information sent by the SMF network element, the subscribe request includes information of a cell to be monitored that uses the satellite backhaul        1001 determining satellite backhaul information corresponding to the cell to be monitored that uses the satellite backhaul in the subscribe request        1002 in response to any terminal entering or leaving the cell to be monitored that uses the satellite backhaul, sending updated satellite backhaul information to the SMF network element        1003

METHOD AND APPARATUS FOR DETERMINING SATELLITE BACKHAUL INFORMATION

CROSS-REFERENCE TO RELATED APPLICATION

This application is a U.S. national phase of International Application No. PCT/CN2020/129144, filed with the State Intellectual Property Office of P. R. China on Nov. 16, 2020.

TECHNICAL FIELD

The disclosure relates to a field of mobile communication technology, in particular to a method for determining satellite backhaul information and an apparatus for determining satellite backhaul information.

BACKGROUND

A backhaul network exists between a core network and a mobile access point such as a cell tower. Mobile terminals communicating with the cell tower constitute a subnetwork, which is connected to the core network over the backhaul. The core network provides business services to the mobile access point through the backhaul network. The backhaul network may be implemented by a satellite network. However, some businesses services used by a mobile terminal have a low latency requirement, such that the potential delay of data transfer over a satellite backhaul cannot meet these low latency requirements. This may negatively impact that the response time of business services.

SUMMARY

According to a first aspect of embodiments of the present disclosure, a method for determining satellite backhaul information is provided. The method is applied to a policy control function (PCF) network element and includes:

determining the satellite backhaul information currently corresponding to a terminal;

in which the satellite backhaul information includes any of the following information: information of whether the terminal is using a satellite backhaul currently, information of whether a network type of the satellite backhaul currently used by the terminal is changed, information of whether the terminal is located within a monitored first cell using the satellite backhaul; in which whether the terminal is using the satellite backhaul currently depends on a second cell where the terminal is located.

According to a second aspect of embodiments of the present disclosure, a method for determining satellite backhaul information is provided. The method is applied to a session management function (SMF) network element and includes:

determining the satellite backhaul information currently corresponding to a terminal; in which the satellite backhaul information includes any of the following information: information of whether the terminal is using a satellite backhaul currently, information of whether a network type of the satellite backhaul currently used by the terminal is changed, information of whether the terminal is located within a monitored first cell using the satellite backhaul; in which whether the terminal is using the satellite backhaul currently depends on a second cell where the terminal is located.

According to a third aspect of embodiments of the present disclosure, a method for determining satellite backhaul information is provided. The method is applied to an access and mobility management function (AMF) network element and includes:

determining the satellite backhaul information currently corresponding to a terminal; in which the satellite backhaul information includes any of the following information: information of whether the terminal is using a satellite backhaul currently, information of whether a network type of the satellite backhaul currently used by the terminal is changed, information of whether the terminal is located within a monitored first cell using the satellite backhaul; in which whether the terminal is using the satellite backhaul currently depends on a second cell where the terminal is located.

According to a fourth aspect of embodiments of the disclosure, a communication device is provided. The communication device includes: a transceiver; a memory; a processor connected respectively to the transceiver and the memory, configured to execute computer executable instructions on the memory to control the transceiver to transmit and receive wireless signals and to perform the method according to the first aspect, or the method according to the second aspect, or the method according to the third aspect.

According to a fifth aspect of the disclosure, a computer storage medium is provided. The computer storage medium has computer executable instructions stored thereon. When computer executable instructions are executed by a processor, the method according to the first aspect, or the method according to the second aspect, or the method according to the third aspect is implemented.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which:

FIG. 1 is a flowchart of a method for determining satellite backhaul information according to an embodiment of the present disclosure;

FIG. 2 is a flowchart of a method for determining satellite backhaul information performed by a PCF network element according to an embodiment of the present disclosure;

FIG. 3 is a flowchart of a method for determining satellite backhaul information according to another embodiment of the present disclosure;

FIG. 4 is a flowchart of a method for determining satellite backhaul information according to another embodiment of the present disclosure;

FIG. 5 is a flowchart of a method for determining satellite backhaul information performed by an SMF network element according to another embodiment of the present disclosure;

FIG. 6 is a flowchart of a method for determining satellite backhaul information according to another embodiment of the present disclosure;

FIG. 7 is a flowchart of a method for determining satellite backhaul information according to another embodiment of the present disclosure;

FIG. 8 is a flowchart of a method for determining satellite backhaul information performed by an AMF network element according to another embodiment of the present disclosure;

FIG. 9 is a flowchart of a method for determining satellite backhaul information according to another embodiment of the present disclosure;

FIG. 10 is a flowchart of a method for determining satellite backhaul information according to another embodiment of the present disclosure;

DETAILED DESCRIPTION

Figure 11:
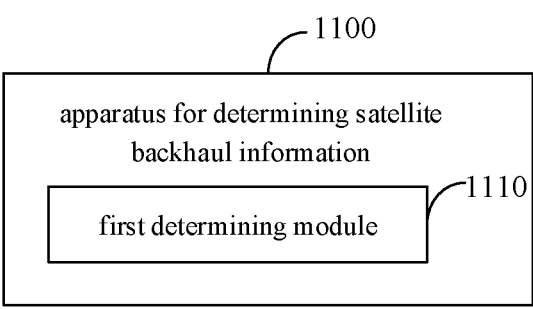
FIG. 11 is a block diagram of an apparatus for determining satellite backhaul information according to an embodiment of the present disclosure.

Reference will now be made in detail to exemplary embodiments, examples of which are illustrated in the accompanying drawings. The following description refers to the accompanying drawings in which the same or similar numbers in different drawings represent the same or similar elements. The embodiments described herein with reference to drawings are explanatory, illustrative, and used to generally understand the present disclosure. The embodiments shall not be construed to limit the present disclosure.

In some special cases, for example, when a user is located within a remote area such as an isolated island, an isolated forest, and a mountainous area, the user needs to use a satellite network backhaul. However, for a strict quality of service (QoS) standard of low delay, the satellite backhaul may not respond to some businesses, so that it cannot meet actual needs.

In embodiments of the present disclosure, it is assumed that there is a broader standard. For the same business, different standards may be configured for the terminal with consideration of the particularity of a location of a terminal with respect to different access points.

FIG. 1 is a flowchart of a method for determining satellite backhaul information according to an embodiment of the present disclosure. The method is executed by a policy control function (PCF) network element to determine satellite backhaul information currently corresponding to a terminal. As shown in FIG. 1, the method for determining satellite backhaul information includes the following steps.

At block 101, the satellite backhaul information currently corresponding to the terminal is determined.

The PCF network element supports a unified policy framework to manage network behavior, and provides a policy rule for a network entity to implement.

In the embodiment, for a cell using a satellite backhaul, a configuration list may be specified. A cell may refer to a certain geographical area, and the configuration list includes information of the cell, such as an identification (ID) of the cell, an ID of an access network node to which the cell belongs, etc. A Cell in the configuration list is a cell that needs to be monitored and uses the satellite backhaul. The cell, for convenience of distinction, is referred to as a first cell here.

In the embodiment, the configuration list may be configured in the PCF network element, a session management function (SMF) network element, or an access and mobility management function (AMF) network element. Or the configuration list may be configured in all of the PCF network element, the SMF network element, and the AMF network element. The PCF network element may obtain satellite backhaul information from the SMF network element, and determine the satellite backhaul information currently corresponding to the terminal according to the satellite backhaul information obtained from the SMF network element.

The satellite backhaul information currently corresponding to the terminal includes any of the following information: information of whether the terminal is using the satellite backhaul currently, information of whether a network type of the satellite backhaul currently used by the terminal is changed, information of whether the terminal is located within a monitored first cell using the satellite backhaul.

Whether the terminal is using the satellite backhaul currently depends on a second cell where the terminal is located. Specifically, if the second cell where the terminal is currently located is the monitored cell using the satellite backhaul, then the terminal is currently using the satellite backhaul. If the second cell where the terminal is currently located is not the monitored cell using the satellite backhaul, then the terminal is not currently using the satellite backhaul.

In the embodiment of the present disclosure, by determining the satellite backhaul information currently corresponding to the terminal, it is convenient to configure a corresponding QoS identifier for the terminal according to the satellite backhaul information currently corresponding to the terminal, so that the corresponding QoS identifier can be configured for the terminal according to the location of the terminal, thus meeting the terminal's requirements for the same business in different geographical areas.

FIG. 2 is a flowchart of a method for determining satellite backhaul information provided by an embodiment of the present disclosure. The method is executed by a PCF network element to determine the satellite backhaul information currently corresponding to a terminal, so as to configure a corresponding QoS identifier for the terminal according to the satellite backhaul information. As shown in FIG. 2, the method for determining satellite backhaul information includes the following steps.

At block 201, the satellite backhaul information currently corresponding to the terminal is determined.

In the embodiment, for a cell using a satellite backhaul, a configuration list may be specified. A cell may refer to a certain geographical area, and the configuration list includes information of the cell, such as an identification (ID) of the cell, an ID of an access network node to which the cell belongs, etc. A Cell in the configuration list is a cell that needs to be monitored and uses the satellite backhaul. The cell, for convenience of distinction, is referred to as the first cell here.

In the embodiment, the configuration list may be configured in the PCF network element, a session management function (SMF) network element, or an access and mobility management function (AMF) network element.

The PCF network element may obtain satellite backhaul information from the SMF network element, and determine the satellite backhaul information currently corresponding to the terminal according to the satellite backhaul information obtained from the SMF network element.

The satellite backhaul information currently corresponding to the terminal includes any of the following information: information of whether the terminal is using the satellite backhaul currently, information of whether a network type of the satellite backhaul currently used by the terminal is changed, information of whether the terminal is located within the monitored first cell using the satellite backhaul.

Whether the terminal is using the satellite backhaul currently depends on a second cell where the terminal is located. Specifically, if the second cell where the terminal is currently located is a monitored cell using the satellite backhaul, then the terminal is currently using the satellite backhaul. If the second cell where the terminal is currently located is not a monitored cell using the satellite backhaul, then the terminal is not currently using the satellite backhaul.

At block 202, in response to the satellite backhaul information currently corresponding to the terminal indicating that the second cell where the terminal is currently located is using the satellite backhaul, a first QoS identifier currently corresponding to the terminal is determined;

or in response to the satellite backhaul information currently corresponding to the terminal indicating that the second cell where the terminal is currently located is not using the satellite backhaul, a second QoS identifier currently corresponding to the terminal is determined.

In some embodiments, the PCF network element may determine the QoS identifier currently corresponding to the terminal according to whether the terminal is currently using the satellite backhaul. The QoS identifier corresponds to a packet delay budget (PDB), and the PDB is configured to indicate a time during which the data packet may be delayed between the user equipment and the gateway.

In response to the satellite backhaul information currently corresponding to the terminal indicating that the second cell where the terminal is currently located is using the satellite backhaul, a broader standard may be used for the businesses requested by the terminal, then the QoS identifier currently corresponding to the terminal is determined. In order to facilitate distinction, the QoS identifier is referred to as the first QoS identifier here.

In the embodiment, in response to the second cell where the terminal is currently located being a cell that uses the satellite backhaul, if the terminal initiates a session request, the PCF network element determines, according to the first QoS identifier corresponding to the terminal, that the satellite network can be used to provide a control policy of a corresponding session request service to the terminal.

In some embodiments, in response to the satellite backhaul information currently corresponding to the terminal indicating that the second cell where the terminal is currently located is not using the satellite backhaul, the business requested by the terminal can use the original strict standard, and the second cell QoS identifier currently corresponding to the terminal is determined.

In the embodiment, in response to the second cell where the terminal is currently located being a cell not using the satellite backhaul, if the terminal initiates a session request, the PCF network element determines, according to the second QoS identifier corresponding to the terminal, that another network with short delay is used to provide a corresponding session request service to the terminal.

In some embodiments, the PDB corresponding to the first QoS identifier is larger than the PDB corresponding to the second QoS identifier.

In the embodiment, when the terminal is located within a cell using the satellite backhaul, the PDB corresponding to the terminal is greater than the PDB corresponding to the terminal when the terminal is not located within a cell using the satellite backhaul. Therefore, in response to the terminal being located within a cell using the satellite backhaul, the business requirement under a strict standard can also be achieved through using the satellite backhaul.

In the embodiment of the present disclosure, by determining the satellite backhaul information currently corresponding to the terminal, and configuring the corresponding QoS identifier for the terminal based on the satellite backhaul information currently corresponding to the terminal indicating whether the terminal is currently located within a cell using the satellite backhaul, the corresponding QoS identifier can be configured for the terminal according to the location of the terminal, so that requirements of the terminal in different geographical areas for the same business are met.

FIG. 3 is a flowchart of a method for determining satellite backhaul information according to another embodiment of the present disclosure. The method for determining satellite backhaul information in the embodiment of the present disclosure is performed by a PCF network element, so as to determine the satellite backhaul information currently corresponding to a terminal according to a locally specified configuration list, and configure a corresponding QoS identifier for the terminal according to the satellite backhaul information.

As shown in FIG. 3, the method for determining satellite backhaul information includes the following steps.

At block 301, a subscribe request for the satellite backhaul information is sent to an SMF network element.

In the embodiment, the PCF network element is configured with a specified configuration list. The configuration list includes information of cells, such as an ID of each cell, an ID of an access network node to which the cell belongs, etc. A cell may refer to a certain geographical area, and a cell in the configuration list is a cell that needs to be monitored and uses the satellite backhaul. The cell is referred to as a first cell here for the convenience of distinction.

The PCF network element may send the subscribe request for the satellite backhaul information to the SMF network element according to the locally specified configuration list. The subscribe request may include any of the following information: information of whether the terminal is using the satellite backhaul currently, information of whether a network type of the satellite backhaul currently used by the terminal is changed, information of whether the terminal is located within the monitored first cell using the satellite backhaul. The subscribe request may also include information such as the ID of the cell to be monitored. The cell to be monitored is the first cell in the configuration list.

At block 302, in response to obtained satellite backhaul information returned by the SMF network element, the satellite backhaul information currently corresponding to the terminal is determined.

After obtaining the subscribe request for the satellite backhaul information sent by the PCF network element, the SMF network element sends the subscribe request for the satellite backhaul information to an AMF network element, and the AMF network element monitors terminals within the cell to be monitored that uses the satellite backhaul according to the subscribe request for the satellite backhaul information. When the AMF network element monitors that a terminal newly enters the cell to be monitored that uses the satellite backhaul, or that a terminal leaves the cell to be monitored that uses the satellite backhaul, etc., the AMF network element can return the satellite backhaul information to the SMF network element. The SMF network element obtains the satellite backhaul information returned by the AMF network element, and returns the satellite backhaul information to the PCF network element.

The PCF network element determines the satellite backhaul information currently corresponding to the terminal in response to the obtained satellite backhaul information returned by the SMF network element. The satellite backhaul information currently corresponding to the terminal may include any of the following information: information of whether the terminal is using the satellite backhaul currently, information of whether a network type of the satellite backhaul currently used by the terminal is changed, information of whether the terminal is located within the monitored first cell using the satellite backhaul. The satellite backhaul information currently corresponding to the terminal may also include information of a cell where the terminal is currently located, and so on. For the convenience of distinction, the cell where the terminal is currently located is referred to as the second cell.

Whether the terminal is using the satellite backhaul currently depends on a second cell where the terminal is located. Specifically, if the second cell where the terminal is currently located is the monitored cell using the satellite backhaul, then the terminal is currently using the satellite backhaul. If the second cell where the terminal is currently located is not the monitored cell using the satellite backhaul, then the terminal is not currently using the satellite backhaul.

The PCF network element can determine, according to the satellite backhaul information returned by the SMF network element, the information of the second cell where the terminal is currently located, such as an ID of the second cell and an ID of an access network node to which the second cell belongs.

After determining the information of the second cell where the terminal is currently located, the PCF network element compares the information of the second cell with information of the first cell in the locally configured and specified configuration list, and determines whether the configuration list contains the information of the second cell. If the information of the second cell exists in the configuration list, it is determined that the terminal is currently using the satellite backhaul, and the terminal is currently located within the monitored cell using the satellite backhaul. If the information of the second cell does not exist in the configuration list, it is determined that the terminal is not currently using the satellite backhaul, and the terminal is not currently located within the monitored first cell using the satellite backhaul. In other words, the satellite backhaul information currently corresponding to the terminal can be determined based on the information of the first cell in the configuration list and the information of the second cell in the configuration list, or based on the information of the second cell and the information of the first cell in the configuration list.

For example, the PCF network element sends a subscribe request for the satellite backhaul information to the SMF network element according to the local configuration list. The subscribe request includes information of three cells A, B, and C that are to be monitored and use the satellite backhaul. The SMF network element forwards the subscribe request for the satellite backhaul information to an AMF network element. The AMF network element monitors the three cells A, B, and C according to the subscribe request. If the AMF network element monitors that a terminal a enters the cell A from a cell that does not use the satellite backhaul, the AMF network element returns the satellite backhaul information to the SMF network element, in which the satellite backhaul information includes information indicating that the satellite backhaul is used by the terminal a, an ID of the cell A where the terminal a is currently located, an ID of an access network node to which the cell A belongs, and so on. After obtaining the satellite backhaul information returned by the AMF network element, the SFM network element forwards the satellite backhaul information to the PCF network element. The PCF network element determines the satellite backhaul information currently corresponding to the terminal a according to the satellite backhaul information returned by the SMF network element. The satellite backhaul information currently corresponding to the terminal a includes information indicating that the satellite backhaul is currently used by the terminal a, information indicating that the terminal a is currently located within the monitored cell A using the satellite backhaul, and the like.

In some embodiments of the present disclosure, if the type of the backhaul network corresponding to the terminal is not changed, the SMF network element does not send the satellite backhaul information to the PCF network element. Therefore, if the PCF network element does not obtain the satellite backhaul information sent by the SMF network element, the PCF network element can determine the satellite backhaul information currently corresponding to the terminal in response to not obtaining the satellite backhaul information returned by the SMF network element, that is, the backhaul information currently corresponding to the terminal is the same as the previously determined information.

At block 303, in response to the satellite backhaul information currently corresponding to the terminal indicating that the second cell where the terminal is currently located is using the satellite backhaul, a first QoS identifier currently corresponding to the terminal is determined;

or in response to the satellite backhaul information currently corresponding to the terminal indicating that the second cell where the terminal is currently located is not using the satellite backhaul, a second QoS identifier currently corresponding to the terminal is determined.

In the embodiment of the present disclosure, block 303 may be implemented in any of the various embodiments of the present disclosure, which is not limited in the embodiment of the present disclosure, and will not be described again.

In the embodiment of the present disclosure, in response to the PCF network element being locally configured with a specified configuration list, the subscribe request for the satellite backhaul information is sent to the SMF network element. In response to the satellite backhaul information returned by the SMF network element, the satellite backhaul information currently corresponding to the terminal is determined according to the locally specified configuration list. The corresponding Qos identifier is configured for the terminal according to the satellite backhaul information currently corresponding to the terminal indicating whether the terminal is currently located within the cell using the satellite backhaul. In this way, the corresponding Qos identifier can be configured for the terminal according to the location of the terminal, which meets requirements of the terminal in different geographical areas for the same business.

FIG. 4 is a flowchart of a method for determining satellite backhaul information according to another embodiment of the present disclosure. The method for determining satellite backhaul information in the embodiment of the present disclosure is performed by a PCF network element. In response to no specified configuration list being configured locally, the satellite backhaul information currently corresponding to the terminal is determined according to obtained satellite backhaul information sent by an SMF network element, so as to configure a corresponding QoS identifier for the terminal according to the satellite backhaul information.

As shown in FIG. 4, the method for determining satellite backhaul information includes the following steps.

At block 401, satellite backhaul information sent by the SMF network element is obtained.

In the embodiment, for a cell using a satellite backhaul, a configuration list may be specified. The configuration list includes information of cells, such as an identification (ID) of each cell, an ID of an access network node to which the cell belongs, etc. A cell may refer to a certain geographical area. A Cell in the configuration list is a cell that needs to be monitored and uses the satellite backhaul. The cell, for convenience of distinction, is referred to as a first cell here.

In the embodiment, the configuration list is not configured in the PCF network element. Alternatively, the configuration list may be configured in an SMF network element, or an AMF network element.

In response to the configuration list being configured in the SMF network element, the SMF network element may send a subscribe request for the satellite backhaul information to the AMF network element according to the local configuration list. The subscribe request may include any one of the following information: information of whether the terminal is using the satellite backhaul currently, information of whether a network type of the satellite backhaul currently used by the terminal is changed, information of whether the terminal is located within the monitored first cell using the satellite backhaul. The subscribe request may also include information of the cell to be monitored that uses the satellite backhaul.

The AMF network element monitors the cell to be monitored that uses the satellite backhaul according to the subscribe request, and sends updated satellite backhaul information to the SMF network element in response to any terminal entering or leaving the cell to be monitored that uses the satellite backhaul, for example, if it is detected that a terminal enters a cell to be monitored that uses the satellite backhaul from a cell that does not use the satellite backhaul, then the satellite backhaul information corresponding to the cell to be monitored that uses the satellite backhaul is updated, and the updated satellite backhaul information is sent to the SMF The network element. After the SMF network element obtains the updated satellite backhaul information, the SMF network element determines the satellite backhaul information currently corresponding to the terminal according to the local configuration list, and sends the satellite backhaul information to the PCF network element, so that the PCF network element obtains the satellite backhaul information sent by the SMF network element.

In some embodiments of the present disclosure, if the type of the backhaul network corresponding to the terminal is not changed, the AMF network element does not send the satellite backhaul information to the SMF network element. If the SMF network element does not obtain the satellite backhaul information returned by the AMF network element, the SMF network element determines the satellite backhaul information currently corresponding to the terminal in response to not obtaining the satellite backhaul information returned by the AMF network element, and sends the satellite backhaul information to the PCF network element. Thus, the PCF network element obtains the satellite backhaul information sent by the SMF network element.

In response to the configuration list being configured in the AMF network element, the AMF network element can monitor each first cell according to information of each first cell in the configuration list, and send the satellite backhaul information to the SMF network element in response to monitoring that the satellite backhaul is currently used by the terminal. The SMF network element sends the obtained satellite backhaul information to the PCF network element, so that the PCF network element obtains the satellite backhaul information sent by the SMF network element.

Optionally, in response to the configuration list being configured in the AMF network element, the AMF network element can monitor each first cell according to the information of each first cell in the configuration list. In response to an update to the satellite backhaul information currently corresponding to the terminal, the AMF network element may also send a satellite backhaul information updating message to the SMF network element. The SMF network element sends the obtained satellite backhaul information updating message to the PCF network element, and the PCF network element obtains the satellite backhaul information updating message sent by the SMF.

At block 402, the satellite backhaul information currently corresponding to the terminal is determined based on the satellite backhaul information sent by the SMF network element.

The satellite backhaul information currently corresponding to the terminal may include any of the following information: information of whether the satellite backhaul is currently used by the terminal, information of whether the type of the backhaul network currently used by the terminal is changed, information of whether the terminal is located within the monitored first cell using the satellite backhaul, information of a cell where the terminal is currently located, and so on. For the convenience of distinction, the cell where the terminal is currently located is referred to as a second cell.

Whether the terminal is using the satellite backhaul currently depends on the second cell where the terminal is located. Specifically, if the second cell where the terminal is currently located is the monitored cell using the satellite backhaul, then the satellite backhaul is currently used by the terminal. If the second cell where the terminal is currently located is not the monitored cell using the satellite backhaul, then the satellite backhaul is not currently used by the terminal.

The PCF network element can determine, according to the satellite backhaul information sent by the SMF network element, the satellite backhaul information currently corresponding to the terminal, and determine, according to the satellite backhaul information returned by the SMF network element, the information of the second cell where the terminal is currently located, such as an ID of the second cell and an ID of an access network node to which the second cell belongs.

After determining the information of the second cell where the terminal is currently located, the PCF network element compares the information of the second cell with information of the first cell in the locally configured and specified configuration list, and determines whether the configuration list contains the information of the second cell. If the information of the second cell exists in the configuration list, it is determined that the satellite backhaul is currently used by the terminal, and the terminal is currently located within the monitored cell using the satellite backhaul. If the information of the second cell does not exist in the configuration list, it is determined that the satellite backhaul is not currently used by the terminal, and the terminal is not currently located within the monitored first cell using the satellite backhaul. In other words, the satellite backhaul information currently corresponding to the terminal can be determined based on the information of the first cell in the configuration list and the information of the second cell in the configuration list, or based on the information of the second cell and the information of the first cell in the configuration list.

In some embodiments of the present disclosure, if the type of the backhaul network corresponding to the terminal is not changed, the SMF network element does not send the satellite backhaul information to the PCF network element. Therefore, if the PCF network element does not obtain the satellite backhaul information sent by the SMF network element within a certain time period, the PCF network element can determine the satellite backhaul information currently corresponding to the terminal in response to not obtaining the satellite backhaul information sent by the SMF network element, that is, the backhaul information currently corresponding to the terminal is the same as the previously determined information.

At block 403, in response to the satellite backhaul information currently corresponding to the terminal indicating that the second cell where the terminal is currently located is using the satellite backhaul, a first QoS identifier currently corresponding to the terminal is determined;

or in response to the satellite backhaul information currently corresponding to the terminal indicating that the second cell where the terminal is currently located is not using the satellite backhaul, a second QoS identifier currently corresponding to the terminal is determined.

In the embodiment of the present disclosure, block 403 may be implemented in any of the various embodiments of the present disclosure, which is not limited in the embodiment of the present disclosure, and will not be described again.

In the embodiment of the present disclosure, in response to the PCF network element being not locally configured with a specified configuration list, the satellite backhaul information sent by the SMF network element is obtained. In response to the satellite backhaul information sent by the SMF network element, the satellite backhaul information currently corresponding to the terminal is determined. The corresponding QoS identifier is configured for the terminal according to the satellite backhaul information currently corresponding to the terminal indicating whether the terminal is currently located within the cell using the satellite backhaul. In this way, the corresponding QoS identifier can be configured for the terminal according to the location of the terminal, which meets requirements of the terminal in different geographical areas for the same business.

FIG. 5 is a flowchart of a method for determining satellite backhaul information according to another embodiment of the present disclosure. The method is performed by an SMF network element to determine satellite backhaul information currently corresponding to a terminal.

As shown in FIG. 5, the method for determining satellite backhaul information includes the following steps.

At block 501, the satellite backhaul information currently corresponding to the terminal is determined.

In the embodiment, for a cell using a satellite backhaul, a configuration list may be specified. A cell may refer to a certain geographical area, and the configuration list includes information of the cell, such as an identification (ID) of the cell, an ID of an access network node to which the cell belongs, etc. A Cell in the configuration list is a cell that needs to be monitored and uses the satellite backhaul. The cell, for convenience of distinction, is referred to as a first cell here.

In the embodiment, the configuration list may be configured in the PCF network element, an SMF network element, or an AMF network element. Or the configuration list may be configured in all of the PCF network element, the SMF network element, and the AMF network element.

The AMF network element monitors the cell using the satellite backhaul, and sends the monitored satellite backhaul information to the SMF network element. The SMF network element obtains the satellite backhaul information sent by the AMF network element, and determines the satellite backhaul information currently corresponding to the terminal according to the satellite backhaul information sent by the AMF network element.

The satellite backhaul information currently corresponding to the terminal includes any of the following information: information of whether the terminal is using the satellite backhaul currently, information of whether a network type of the satellite backhaul currently used by the terminal is changed, information of whether the terminal is located within a monitored first cell using the satellite backhaul.

Whether the terminal is using the satellite backhaul currently depends on a second cell where the terminal is located. Specifically, if the second cell where the terminal is currently located is the monitored cell using the satellite backhaul, then the terminal is currently using the satellite backhaul. If the second cell where the terminal is currently located is not the monitored cell using the satellite backhaul, then the terminal is not currently using the satellite backhaul.

In the embodiment of the present disclosure, by determining the satellite backhaul information currently corresponding to the terminal, it is convenient send the satellite backhaul information currently corresponding to the terminal to the PCF network element subsequently, so that the PCF network element configures a corresponding QoS identifier for the terminal according to the satellite backhaul information currently corresponding to the terminal indicating whether the terminal is currently located within the cell using the satellite backhaul. In this way, the corresponding QoS identifier can be configured for the terminal according to the location of the terminal, thus meeting the terminal's requirements for the same business in different geographical areas.

FIG. 6 is a flowchart of a method for determining satellite backhaul information provided by another embodiment of the present disclosure. The method is executed by an SMF network element.

As shown in FIG. 6, the method for determining satellite backhaul information includes the following steps.

At block 601, a subscribe request for the satellite backhaul information is sent to an AMF network element.

In the embodiment, for a cell using a satellite backhaul, a configuration list may be specified. The configuration list includes information of cells, such as an identification (ID) of each cell, an ID of an access network node to which the cell belongs, etc. A cell may refer to a certain geographical area, and a cell in the configuration list is a cell that needs to be monitored and uses the satellite backhaul. The cell, for convenience of distinction, is referred to as a first cell here.

When the SMF network element is configured with the configuration list or the PCF network element is configured with the configuration list, the SMF network element may send the subscribe request for the satellite backhaul information to an AMF network element. The subscribe request may include any of the following information: information of whether the terminal is using the satellite backhaul currently, information of whether a network type of the satellite backhaul currently used by the terminal is changed, information of whether the terminal is located within the monitored first cell using the satellite backhaul. The subscribe request may also include information of the cell to be monitored that uses the satellite backhaul.

The AMF network element monitors the cell to be monitored that uses the satellite backhaul according to the subscribe request, and sends updated satellite backhaul information to the SMF network element in response to any terminal entering or leaving the cell to be monitored that uses the satellite backhaul, for example, if it is monitored that a terminal enters a cell to be monitored that uses the satellite backhaul from a cell that does not use the satellite backhaul, then the satellite backhaul information corresponding to the cell to be monitored that uses the satellite backhaul is updated, and the updated satellite backhaul information is sent to the SMF The network element, so that the SMF network element obtains the updated satellite backhaul information sent by the AMF network element.

At block 602, in response to the obtained satellite backhaul information returned by the AMF network element, the satellite backhaul information currently corresponding to the terminal is determined.

In the embodiment, the SMF network element determines the satellite backhaul information currently corresponding to the terminal according to the obtained satellite backhaul information returned by the AMF network element.

If the SMF network element is configured with the configuration list, after obtaining the satellite backhaul information returned by the AMF network element, the SMF network element determines the satellite backhaul information currently corresponding to the terminal according to the local configuration list.

In response to determining the satellite backhaul information currently corresponding to the terminal, the SMF network element can determine, according to updated satellite backhaul information returned by the AMF network element, information of a second cell where the terminal is currently located, such as an ID of the second cell, the second cell, an ID of an access network node to which the second cell belongs, etc.

After determining the information of the second cell where the terminal is currently located, the SMF network element compares the information of the second cell with information of the first cell in the locally configured and specified configuration list, and determines whether the configuration list contains the information of the second cell. If the information of the second cell exists in the configuration list, it is determined that the satellite backhaul is currently used by the terminal, and the terminal is currently located within the monitored cell using the satellite backhaul. If the information of the second cell does not exist in the configuration list, it is determined that the satellite backhaul is not currently used by the terminal, and the terminal is not currently located within the monitored first cell using the satellite backhaul. In other words, the satellite backhaul information currently corresponding to the terminal can be determined based on the information of the first cell in the configuration list and the information of the second cell in the configuration list, or based on the information of the second cell and the information of the first cell in the configuration list.

In some embodiments of the present disclosure, if the type of the backhaul network corresponding to the terminal is not changed, the AMF network element does not send the satellite backhaul information to the SMF network element. Therefore, if the SMF network element does not obtain the satellite backhaul information returned by the AMF network element, the SMF network element can determine the satellite backhaul information currently corresponding to the terminal in response to not obtaining the satellite backhaul information returned by the AMF network element.

At block 603, in response to the satellite backhaul being currently used by the terminal, the satellite backhaul information is sent to the PCF network element.

In the embodiment, the SMF network element may, in response to the satellite backhaul information currently corresponding to the terminal indicating that the satellite backhaul is currently used by the terminal, send the satellite backhaul information to the PCF network element.

Optionally, in response to an update to the satellite backhaul information currently corresponding to the terminal, the SMF network element may also send the updated satellite backhaul information to the PCF network element.

Optionally, the PCF network element is configured with the configuration list, the PCF network element sends a subscribe request for the satellite backhaul information to the SMF network element according to the configuration list, and the SMF network element obtains the subscribe request for the satellite backhaul information sent by the PCF network element. The subscribe request includes the information of the cell to be monitored that uses the satellite backhaul. In response to any terminal entering or leaving the cell to be monitored that uses the satellite backhaul, the SMF network element sends updated satellite backhaul information to the PCF network element. Therefore, the SMF network element can return the satellite backhaul information to the PCF network element according to the subscribe request sent by the PCF network element.

The number of cells to be monitored that use the satellite backhaul included in the subscribe request may be one or multiple. For example, there are three cells A, B, and C to be monitored that use the satellite backhaul. If the three cells are not adjacent to each other, for each of the three cells A, B, and C, in response to a terminal entering or leaving, the SMF network element can send the updated satellite backhaul information to the PCF network element. If the three cells A, B, and C are adjacent to each other, the three cells can be regarded as a whole. In response to a terminal entering from a cell that does not use the satellite backhaul, or leaving the cell to be monitored that uses the satellite backhaul to enter a cell that does not use the satellite backhaul, the SMF network element sends the updated satellite backhaul information to the PCF network element.

The PCF network element obtains the satellite backhaul information sent by the SMF network element, and can configure a corresponding QoS identifier for the terminal according to the satellite backhaul information currently corresponding to the terminal.

In the embodiment of the present disclosure, the subscribe request for the satellite backhaul information is sent to the AMF network element. In response to the obtained satellite backhaul information returned by the AMF network element, the satellite backhaul information currently corresponding to the terminal is determined. In response to the satellite backhaul being currently used by the terminal, or in response to the satellite backhaul information currently corresponding to the terminal, etc., the satellite backhaul information is sent to the PCF network element, so that the PCF network element configures a corresponding QoS identifier for the terminal according to the satellite backhaul information currently corresponding to the terminal indicating whether the terminal is currently located within a cell using the satellite backhaul. In this way, the corresponding QoS identifier can be configured for the terminal according to the location of the terminal, which meets requirements of the terminal in different geographical areas for the same business.

FIG. 7 is a flowchart of a method for determining satellite backhaul information according to another embodiment of the present disclosure.

The method for determining satellite backhaul information in the embodiment of the present disclosure is performed by an SMF network element. In response to a configuration list being configured in an SMF network element, the satellite backhaul information currently corresponding to the terminal is determined according to obtained satellite backhaul information sent by the AMF network element, and the satellite backhaul information currently corresponding to the terminal is sent to the PCF network element, so that the PCF network element configures a corresponding QoS identifier for the terminal according to the satellite backhaul information.

As shown in FIG. 7, the method for determining satellite backhaul information includes the following steps.

At block 701, satellite backhaul information sent by the AMF network element is obtained.

In the embodiment, for a cell using a satellite backhaul, a configuration list may be specified. A cell may refer to a certain geographical area. The configuration list includes information of cells, such as an identification (ID) of each cell, an ID of an access network node to which the cell belongs, etc. A Cell in the configuration list is a cell that needs to be monitored and uses the satellite backhaul. The cell, for convenience of distinction, is referred to as a first cell here.

In the embodiment, the configuration list is not configured in the SMF network element, but in the AMF network element.

The AMF network element can monitor each first cell according to information of each first cell in the configuration list, and send the satellite backhaul information to the SMF network element in response to monitoring that the satellite backhaul is currently used by the terminal. Therefore, the SMF network element obtains the satellite backhaul information sent by the AMF network element.

Optionally, in response to the configuration list being configured in the AMF network element, the AMF network element can monitor each first cell according to the information of each first cell in the configuration list. In response to an update to the satellite backhaul information currently corresponding to the terminal, the AMF network element may also send a satellite backhaul information updating message to the SMF network element. The SMF network element obtains the satellite backhaul information updating message sent by the AMF network element.

For example, if the AMF network element monitors that a terminal moves from a cell A using the satellite backhaul to a cell F that does not use the satellite backhaul, the AMF network element sends a satellite backhaul information updating message to the SMF network element, and the SMF network element obtains the satellite backhaul information updating message sent by AMF network element.

At block 702, the satellite backhaul information currently corresponding to the terminal is determined based on the satellite backhaul information sent by the AMF network element.

In the embodiment, the SMF network element may determine the satellite backhaul information currently corresponding to the terminal according to the satellite backhaul information sent by the AMF network element.

In some embodiments of the present disclosure, if the type of the backhaul network corresponding to the terminal is not changed, the AMF network element does not send the satellite backhaul information to the SMF network element. Therefore, if the SMF network element does not obtain the satellite backhaul information sent by the AMF network element, the SMF network element determines the satellite backhaul information currently corresponding to the terminal in response to not obtaining the satellite backhaul information returned by the AMF network element.

The satellite backhaul information currently corresponding to the terminal may include any of the following information: information of whether the terminal is using the satellite backhaul currently, information of whether the network type of the satellite backhaul currently used by the terminal is changed, information of whether the terminal is located within the monitored first cell using the satellite backhaul, information of a cell where the terminal is currently located, and so on. For the convenience of distinction, the cell where the terminal is currently located is referred to as a second cell.

Whether the terminal is using the satellite backhaul currently depends on the second cell where the terminal is located. Specifically, if the second cell where the terminal is currently located is the monitored cell using the satellite backhaul, then the satellite backhaul is currently used by the terminal. If the second cell where the terminal is currently located is not the monitored cell using the satellite backhaul, then the satellite backhaul is not currently used by the terminal.

At block 703, in response to the satellite backhaul being currently used by the terminal, the satellite backhaul information is sent to the PCF network element.

In the embodiment, the SMF network element may, in response to the satellite backhaul information currently corresponding to the terminal indicating that the satellite backhaul is currently used by the terminal, send the satellite backhaul information to the PCF network element.

Optionally, in response to an update to the satellite backhaul information currently corresponding to the terminal, the SMF network element may also send the updated satellite backhaul information to the PCF network element.

The PCF network element obtains the satellite backhaul information sent by the SMF network element, and can configure a corresponding QoS identifier for the terminal according to the satellite backhaul information currently corresponding to the terminal.

Optionally, the PCF network element is configured with the configuration list, the PCF network element sends a subscribe request for the satellite backhaul information to the SMF network element according to the configuration list, and the SMF network element obtains the subscribe request for the satellite backhaul information sent by the PCF network element. The subscribe request includes the information of the cell to be monitored that uses the satellite backhaul. In response to any terminal entering or leaving the cell to be monitored that uses the satellite backhaul, the SMF network element sends updated satellite backhaul information to the PCF network element. Therefore, the SMF network element can return the satellite backhaul information to the PCF network element according to the subscribe request sent by the PCF network element.

The number of cells to be monitored that use the satellite backhaul included in the subscribe request may be one or multiple. For example, there are three cells A, B, and C to be monitored that use the satellite backhaul. If the three cells are not adjacent to each other, for each of the three cells A, B, and C, in response to a terminal entering or leaving, the SMF network element can send the updated satellite backhaul information to the PCF network element. If the three cells A, B, and C are adjacent to each other, the three cells can be regarded as a whole. In response to a terminal entering from a cell that does not use the satellite backhaul, or leaving the cell to be monitored that uses the satellite backhaul to enter a cell that does not use the satellite backhaul, the SMF network element sends the updated satellite backhaul information to the PCF network element.

In the embodiment of the present disclosure, in response to the specified configuration list being configured in the AMF network element, the satellite backhaul information currently corresponding to the terminal is determined according to the satellite backhaul information sent by the AMF network element by obtaining the satellite backhaul information sent by the AMF network element. Further, in response to the satellite backhaul being currently used by the terminal, or in response to the update to the satellite backhaul information currently corresponding to the terminal, etc., the satellite backhaul information is sent to the PCF network element, so that the PCF network element configures a corresponding QoS identifier for the terminal according to the satellite backhaul information currently corresponding to the terminal indicating whether the terminal is currently located within a cell using the satellite backhaul. In this way, the corresponding QoS identifier can be configured for the terminal according to the location of the terminal, which meets requirements of the terminal in different geographical areas for the same business.

FIG. 8 is a flowchart of a method for determining satellite backhaul information according to another embodiment of the present disclosure. The method is performed by an AMF network element to determine satellite backhaul information currently corresponding to a terminal.

As shown in FIG. 8, the method for determining satellite backhaul information includes the following steps.

At block 801, the satellite backhaul information currently corresponding to the terminal is determined.

In the embodiment, for a cell using satellite backhaul, a configuration list may be specified. A cell may refer to a certain geographical area, and the configuration list includes information of the cell, such as an identification (ID) of the cell, an ID of an access network node to which the cell belongs, etc. A Cell in the configuration list is a cell that needs to be monitored and uses the satellite backhaul. The cell, for convenience of distinction, is referred to as a first cell here.

In the embodiment, the configuration list may be configured in the PCF network element, an SMF network element, or an AMF network element. Or the configuration list may be configured in all of the PCF network element, the SMF network element, and the AMF network element.

The AMF network element monitors the cell using the satellite backhaul according to the information of the cell to be monitored that uses the satellite backhaul, and determines the satellite backhaul information currently corresponding to the terminal according to the monitored result.

The satellite backhaul information currently corresponding to the terminal includes any of the following information: information of whether the terminal is using the satellite backhaul currently, information of whether a network type of a backhaul currently used by the terminal is changed, information of whether the terminal is located within a monitored first cell using the satellite backhaul. Whether the terminal is using the satellite backhaul currently depends on a second cell where the terminal is located.

In the embodiment of the present disclosure, by determining the satellite backhaul information currently corresponding to the terminal, the PCF network element configures a corresponding QoS identifier for the terminal according to the satellite backhaul information currently corresponding to the terminal, so that the corresponding QoS identifier can be configured for the terminal according to the location of the terminal, thus meeting the terminal's requirements for the same business in different geographical areas.

FIG. 9 is a flowchart of a method for determining satellite backhaul information provided by another embodiment of the present disclosure. The method is executed by an AMF network element. In response to a specified configuration list being configured locally, the satellite backhaul information currently corresponding to a terminal is determined according to the configuration list.

As shown in FIG. 9, the method for determining satellite backhaul information includes the following steps.

At block 901, information of a second cell where the terminal is currently located is determined.

In the embodiment, the AMF network element is configured with a specified configuration list. The configuration list includes information of cells, such as an ID of each cell, an ID of an access network node to which the cell belongs, etc. A cell may refer to a certain geographical area, and a cell in the configuration list is a cell that needs to be monitored and uses the satellite backhaul. The cell is referred to as a first cell here for the convenience of distinction.

The AMF network element monitors the first cell using the satellite backhaul in the configuration list to determine the information of the cell where the terminal is currently located. For the convenience of distinction, the cell where the terminal is currently located is referred as to the second cell.

At block 902, the satellite backhaul information currently corresponding to the terminal is determined based on information of the first cell in the specified configuration list and the information of the second cell.

After obtaining the information of the second cell where the terminal is located, the AMF network element compares the information of the second cell with the information of the first cell in the locally specified configuration list, and determines whether the configuration list contains the information of the second cell. If the information of the second cell exists in the configuration list, it is determined that the terminal is currently using the satellite backhaul, and the terminal is currently located within the monitored cell using the satellite backhaul. If the information of the second cell does not exist in the configuration list, it is determined that the terminal is not currently using the satellite backhaul, and the terminal is not currently located within the monitored first cell using the satellite backhaul. In other words, the satellite backhaul information currently corresponding to the terminal can be determined based on the information of the first cell in the configuration list and the information of the second cell in the configuration list, or based on the information of the second cell and the information of the first cell in the configuration list.

At block 903, in response to the satellite backhaul being currently used by the terminal, the satellite backhaul information is sent to the SMF network element.

In the embodiment, the AMF network element may, in response to the satellite backhaul information currently corresponding to the terminal indicating that the satellite backhaul is currently used by the terminal, send the satellite backhaul information to the SMF network element, and the SMF network element sends the satellite backhaul information to the PCF network element.

Optionally, in response to an update to the satellite backhaul information currently corresponding to the terminal, the AMF network element may also send the updated satellite backhaul information to the SMF network element, and the SMF network element sends the updated satellite backhaul information to the PCF network element.

In the embodiment of the present disclosure, the information of the second cell where the terminal is currently located is determined. According to the information of the first cell in the specified configuration list and the information of the second cell, the satellite backhaul information currently corresponding to the terminal is determined. In response to the satellite backhaul being currently used by the terminal, the satellite backhaul information is sent to the SMF network element, or in response to the update to the satellite backhaul information currently corresponding to the terminal, the updated satellite backhaul information is sent to the SMF network element. Therefore, the SMF network element can send the satellite backhaul information to the PCF network element, so that the PCF network element configures the terminal with a corresponding QoS identifier according to the satellite backhaul information currently corresponding to the terminal.

FIG. 10 is a flowchart of a method for determining satellite backhaul information according to another embodiment of the present disclosure. The method is performed by an AMF network element to monitor a cell to be monitored that uses a satellite backhaul based on a subscribe request for satellite backhaul information sent by an SMF network element.

As shown in FIG. 10, the method for determining satellite backhaul information includes the following steps.

At block 1001, a subscribe request for the satellite backhaul information sent by the SMF network element is obtained. The subscribe request includes information of a cell to be monitored that uses a satellite backhaul.

In the embodiment, for a cell using the satellite backhaul, a configuration list may be specified. The configuration list includes information of cells, such as an identification (ID) of each cell, an ID of an access network node to which the cell belongs, etc. A cell may refer to a certain geographical area, and a cell in the configuration list is a cell that needs to be monitored and uses the satellite backhaul. The cell, for convenience of distinction, is referred to as a first cell here.

In the embodiment, the configuration list can be configured in the PCF network element or the SMF network element. In response to the configuration list being configured in the PCF network element or the SMF network element, the AMF network element obtains the subscribe request for the satellite backhaul information sent by the SMF network element. The subscription request includes the information of the cell to be monitored that uses the satellite backhaul, such as an ID of the cell, an ID of an access network node to which the cell belongs, and the like.

At block 1002, satellite backhaul information corresponding to the cell to be monitored that uses the satellite backhaul in the subscribe request is determined.

In the embodiment, the AMF network element performs satellite backhaul monitoring on the cell to be monitored that uses the satellite backhaul according to the information of the cell to be monitored that uses the satellite backhaul in the subscribe request to determine the satellite backhaul information corresponding to the cell to be monitored that uses the satellite backhaul.

At block 1003, in response to any terminal entering or leaving the cell to be monitored that uses the satellite backhaul, updated satellite backhaul information is sent to the SMF network element.

In the embodiment, in response to the AMF network element monitoring an update to the satellite backhaul information corresponding to the cell to be monitored that uses the satellite backhaul in the subscribe request, for example, in response to the terminal entering the cell to be monitored that uses the satellite backhaul from a cell that does not use the satellite backhaul, or in response to a terminal moving from the cell to be monitored that uses the satellite backhaul to a cell that does not use the satellite backhaul, the updated satellite backhaul information is sent to the SMF network element.

In the embodiment, the number of cells to be monitored that use the satellite backhaul included in the subscribe request may be one or multiple. For example, there are three cells A, B, and C to be monitored that use the satellite backhaul. If the three cells are not adjacent to each other, for each of the three cells A, B, and C, in response to a terminal entering or leaving, the AMF network element can send the updated satellite backhaul information to the SMF network element. If the three cells A, B, and C are adjacent to each other, the three cells can be regarded as a whole. In response to a terminal entering from a cell that does not use the satellite backhaul, or leaving the cell to be monitored that uses the satellite backhaul to enter a cell that does not use the satellite backhaul, the AMF network element sends the updated satellite backhaul information to the SMF network element.

If the configuration list is configured in the SMF network element, the SMF network element can determine the satellite backhaul information currently corresponding to the terminal according to the local configuration list and the satellite backhaul information returned by the AMF network element, and send the satellite backhaul information currently corresponding to the terminal to the PCF network element. If the configuration list is configured in the PCF network element, the SMF network element can return the satellite backhaul information returned by the AMF network element to the PCF network element. The PCF network element determines the satellite backhaul information currently corresponding to the terminal according to the local configuration list and the satellite backhaul information returned by the SMF network element current. The satellite backhaul information currently corresponding to the terminal may include any of the following information: information of whether the terminal is using the satellite backhaul currently, information of whether a network type of the satellite backhaul currently used by the terminal is changed, information of whether the terminal is located within the monitored first cell using the satellite backhaul.

Whether the terminal is using the satellite backhaul currently depends on a second cell where the terminal is located. Specifically, if the second cell where the terminal is currently located is the cell using the satellite backhaul, then the terminal is currently using the satellite backhaul. If the second cell where the terminal is currently located is not the cell using the satellite backhaul, then the terminal is not currently using the satellite backhaul.

In the embodiment of the present disclosure, the subscribe request for the satellite backhaul information sent by an SMF network element is obtained. The subscribe request includes information of a cell to be monitored that uses the satellite backhaul. The satellite backhaul information corresponding to the cell to be monitored that uses the satellite backhaul in the subscribe request is determined. The updated satellite backhaul information is sent to the SMF network element in response to any terminal entering or leaving the cell to be monitored that uses the satellite backhaul. In this way, the AMF network element can perform satellite backhaul monitoring on the cell to be monitored that uses the satellite backhaul according to the subscribe request for the satellite backhaul information sent by the SMF network element, and send the updated satellite backhaul information to the SMF network element in response to any terminal entering or leaving the cell to be monitored that uses the satellite backhaul, and the SMF network element can send the satellite backhaul information to the PCF network element.

Figure 12:
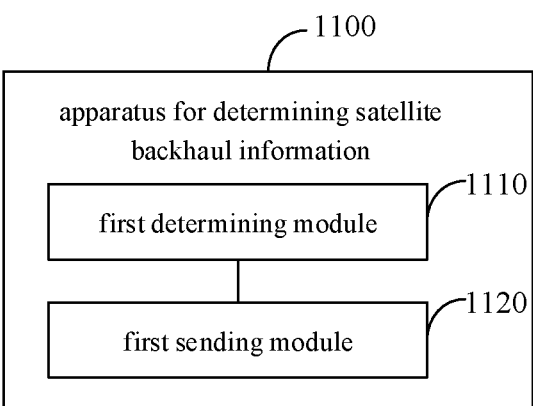
FIG. 12 is a block diagram of an apparatus for determining satellite backhaul information according to an embodiment of the present disclosure.
Figure 13:
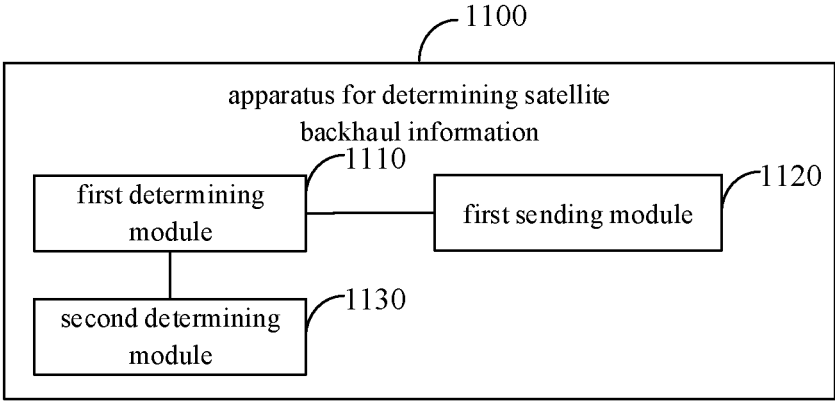
FIG. 13 is a block diagram of an apparatus for determining satellite backhaul information according to an embodiment of the present disclosure.

Corresponding to the method for determining satellite backhaul information provided by the above-mentioned embodiments, the present disclosure also provides an apparatus for determining satellite backhaul information. The apparatus for determining satellite backhaul information provided in the embodiment corresponds to the method for determining satellite backhaul information provided by the above-mentioned embodiments. Therefore, the implementation of the method for determining satellite backhaul information is also applicable to the apparatus for determining satellite backhaul information provided in the embodiment, which will not be described in detail in the embodiment. FIG. 11-13 are block diagrams of an apparatus for determining satellite backhaul information according to the present disclosure.

FIG. 11 is a block diagram of an apparatus for determining satellite backhaul information according to an embodiment of the present disclosure. The apparatus is applied in a PCF network element.

As shown in FIG. 11, the apparatus 1100 for determining satellite backhaul information includes a first determining module 1110.

The first determining module 1110 is configured to determine the satellite backhaul information currently corresponding to a terminal. The satellite backhaul information includes any of the following information: information of whether the terminal is using a satellite backhaul currently, information of whether a network type of the satellite backhaul currently used by the terminal is changed, information of whether the terminal is located within a monitored first cell using the satellite backhaul; in which whether the terminal is using the satellite backhaul currently depends on a second cell where the terminal is located.

In the embodiment, for a cell using the satellite backhaul, a configuration list may be specified. A cell may refer to a certain geographical area, and the configuration list includes information of the cell, such as an identification (ID) of the cell, an ID of an access network node to which the cell belongs, etc. A Cell in the configuration list is a cell that needs to be monitored and uses the satellite backhaul. The cell, for convenience of distinction, is referred to as the first cell here.

In the embodiment, the configuration list may be configured in the PCF network element, a session management function (SMF) network element, or an access and mobility management function (AMF) network element. Or the configuration list may be configured in all of the PCF network element, the SMF network element, and the AMF network element.

In some embodiments of the present disclosure, in response to the PCF network element being configured with the specified configuration list, the first determining module 1110 is configured to: determine information of the second cell where the terminal is currently located; and determine the satellite backhaul information currently corresponding to the terminal based on information of a first cell in a specified configuration list and the information of the second cell; in which information of a cell includes any of the following information: an identification (ID) of the cell, and an ID of an access network node to which the cell belongs.

In some embodiments of the present disclosure, as shown in FIG. 12, the apparatus 1100 further includes: a first sending module 1120.

The first sending module 1120 is configured to send a subscribe request for the satellite backhaul information to an SMF network element, in which the subscribe request includes any of the following information: the information of whether the terminal is using the satellite backhaul currently, the information of whether the network type of the satellite backhaul currently used by the terminal is changed, the information of whether the terminal is located within the monitored first cell using the satellite backhaul.

In some embodiments of the present disclosure, the first determining module 1110 is configured to: in response to obtained satellite backhaul information returned by the SMF network element, determine the satellite backhaul information currently corresponding to the terminal;

or in response to not obtaining satellite backhaul information returned by the SMF network element, determine the satellite backhaul information currently corresponding to the terminal.

In some embodiments of the present disclosure, as shown in FIG. 12, the apparatus 1100 further includes: a second determining module 1130, configured to, in response to the satellite backhaul information currently corresponding to the terminal indicating that the second cell where the terminal is currently located is using the satellite backhaul, determine a first quality of service (QoS) identifier currently corresponding to the terminal;

or in response to the satellite backhaul information currently corresponding to the terminal indicating that the second cell where the terminal is currently located is not using the satellite backhaul, determine a second quality of service (QoS) identifier currently corresponding to the terminal;

in which a packet delay budget (PDB) corresponding to the first QoS identifier is greater than a PDB corresponding to the second QoS identifier.

In the embodiment of the present disclosure, by determining the satellite backhaul information currently corresponding to the terminal, and configuring a corresponding QoS identifier for the terminal according to the satellite backhaul information currently corresponding to the terminal indicating whether the terminal is currently located within the cell using the satellite backhaul, the corresponding QoS identifier can be configured for the terminal according to the location of the terminal, thus meeting the terminal's requirements for the same business in different geographical areas.

Figure 14:
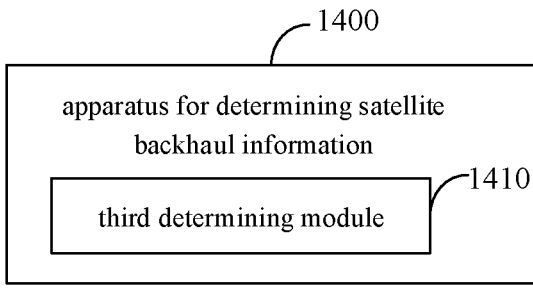
FIG. 14 is a block diagram of an apparatus for determining satellite backhaul information according to another embodiment of the present disclosure.
Figure 15:
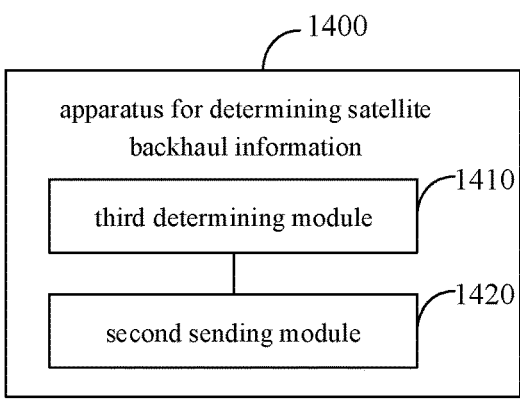
FIG. 15 is a block diagram of an apparatus for determining satellite backhaul information according to another embodiment of the present disclosure.
Figure 16:
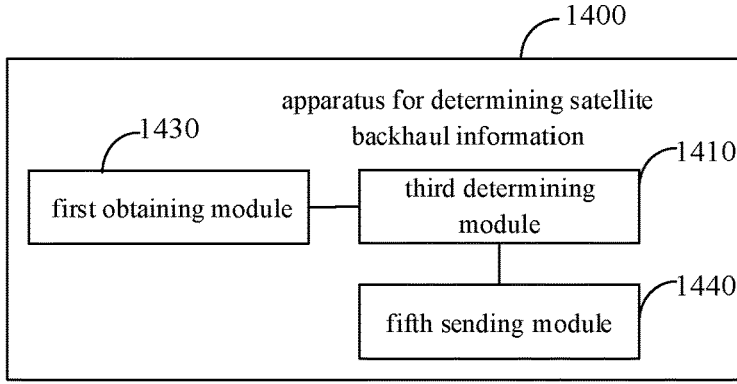
FIG. 16 is a block diagram of an apparatus for determining satellite backhaul information according to another embodiment of the present disclosure.

Corresponding to the method for determining satellite backhaul information provided by the above-mentioned embodiments, the present disclosure also provides an apparatus for determining satellite backhaul information. The apparatus for determining satellite backhaul information provided in the embodiment corresponds to the method for determining satellite backhaul information provided by the above-mentioned embodiments. Therefore, the implementation of the method for determining satellite backhaul information is also applicable to the apparatus for determining satellite backhaul information provided in the embodiment, which will not be described in detail in the embodiment. FIG. 14-16 are block diagrams of an apparatus for determining satellite backhaul information according to the present disclosure.

FIG. 14 is a block diagram of an apparatus for determining satellite backhaul information according to an embodiment of the present disclosure. The apparatus is applied in an SMF network element.

As shown in FIG. 14, the apparatus 1400 includes a third determining module 1410.

The third determining module 1410 is configured to determine the satellite backhaul information currently corresponding to a terminal; in which the satellite backhaul information includes any of the following information: information of whether the terminal is using a satellite backhaul currently, information of whether a network type of the satellite backhaul currently used by the terminal is changed, information of whether the terminal is located within a monitored first cell using the satellite backhaul; in which whether the terminal is using the satellite backhaul currently depends on a second cell where the terminal is located.

In the embodiment, for a cell using the satellite backhaul, a configuration list may be specified. A cell may refer to a certain geographical area, and the configuration list includes information of the cell, such as an identification (ID) of the cell, an ID of an access network node to which the cell belongs, etc. A Cell in the configuration list is a cell that needs to be monitored and uses the satellite backhaul. The cell, for convenience of distinction, is referred to as the first cell here.

In the embodiment, the configuration list may be configured in a PCF network element, the SMF network element, or an AMF network element. Or the configuration list may be configured in all of the PCF network element, the SMF network element, and the AMF network element.

In some embodiments of the present disclosure, in response to the SMF network element being configured with the specified configuration list, the third determining module

1410 is configured to: determine information of the second cell where the terminal is currently located; and determine the satellite backhaul information currently corresponding to the terminal based on information of a first cell in a specified configuration list and the information of the second cell; in which information of a cell comprises any of the following information: an identification (ID) of the cell, and an ID of an access network node to which the cell belongs.

In some embodiments of the present disclosure, as shown in FIG. 15, the apparatus 1400 further includes: a second sending module 1420, configured to send a subscribe request for the satellite backhaul information to an AMF network element, in which the subscribe request includes any of the following information: the information of whether the terminal is using the satellite backhaul currently, the information of whether the network type of the satellite backhaul currently used by the terminal is changed, the information of whether the terminal is located within the monitored first cell using the satellite backhaul.

In some embodiments of the present disclosure, the third determining module 1410 is configured to: in response to obtained satellite backhaul information returned by the AMF network element, determine the satellite backhaul information currently corresponding to the terminal;

or in response to not obtaining satellite backhaul information returned by the AMF network element, determine the satellite backhaul information currently corresponding to the terminal.

In some embodiments of the present disclosure, the apparatus further includes: a third sending module, configured to, in response to the satellite backhaul being currently used by the terminal, send the satellite backhaul information to a PCF network element.

In some embodiments of the present disclosure, the apparatus further includes: a fourth sending module, configured to, in response to an update to the satellite backhaul information currently corresponding to the terminal, send updated satellite backhaul information to a PCF network element.

In some embodiments of the present disclosure, as shown in FIG. 16, the apparatus 1400 further includes: a first obtaining module 1430, configured to obtain a subscribe request for the satellite backhaul information sent by a PCF network element, in which the subscribe request includes information of a cell using the satellite backhaul to be monitored; and a fifth sending module 1440, configured to, in response to any terminal enters or leaves the cell using the satellite backhaul to be monitored, send updated satellite backhaul information to the PCF network element.

In the embodiment of the present disclosure, by determining the satellite backhaul information currently corresponding to the terminal, it is convenient to send the satellite backhaul information currently corresponding to the terminal to the PCF network element, so that the PCF network element configures a corresponding QoS identifier for the terminal according to the satellite backhaul information currently corresponding to the terminal indicating whether the terminal is currently located within the cell using the satellite backhaul. In this way, the corresponding QoS identifier can be configured for the terminal according to the location of the terminal, thus meeting the terminal's requirements for the same business in different geographical areas.

Figure 17:
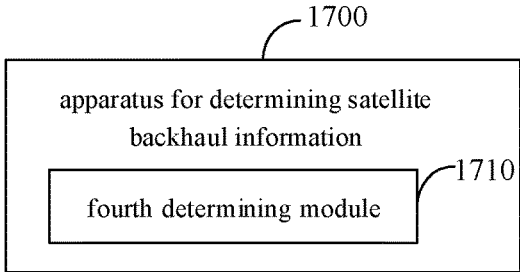
FIG. 17 is a block diagram of an apparatus for determining satellite backhaul information according to another embodiment of the present disclosure.
Figure 18:
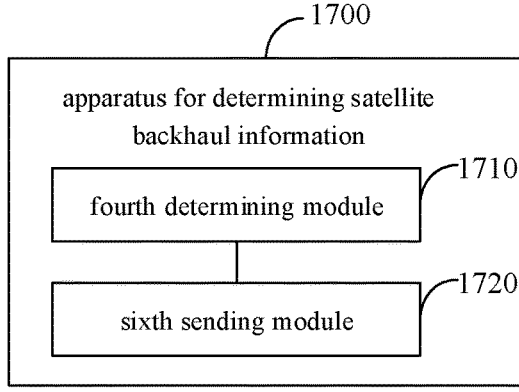
FIG. 18 is a block diagram of an apparatus for determining satellite backhaul information according to another embodiment of the present disclosure.
Figure 19:
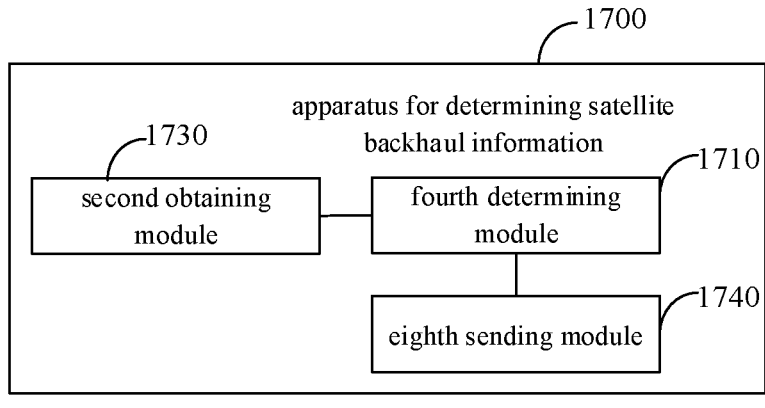
FIG. 19 is a block diagram of an apparatus for determining satellite backhaul information according to another embodiment of the present disclosure.

Corresponding to the method for determining satellite backhaul information provided by the above-mentioned embodiments, the present disclosure also provides an apparatus for determining satellite backhaul information. The apparatus for determining satellite backhaul information provided in the embodiment corresponds to the method for determining satellite backhaul information provided by the above-mentioned embodiments. Therefore, the implementation of the method for determining satellite backhaul information is also applicable to the apparatus for determining satellite backhaul information provided in the embodiment, which will not be described in detail in the embodiment. FIG. 17-19 are block diagrams of an apparatus for determining satellite backhaul information according to the present disclosure.

FIG. 17 is a block diagram of an apparatus for determining satellite backhaul information according to an embodiment of the present disclosure. The apparatus is applied in an AMF network element.

As shown in FIG. 17, the apparatus 1700 includes a fourth determining module 1710.

The fourth determining module 1710 is configured to determine the satellite backhaul information currently corresponding to a terminal; in which the satellite backhaul information includes any of the following information: information of whether the terminal is using a satellite backhaul currently, information of whether a network type of the satellite backhaul currently used by the terminal is changed, information of whether the terminal is located within a monitored first cell using the satellite backhaul; in which whether the terminal is using the satellite backhaul currently depends on a second cell where the terminal is located.

In the embodiment, for a cell using the satellite backhaul, a configuration list may be specified. A cell may refer to a certain geographical area, and the configuration list includes information of the cell, such as an identification (ID) of the cell, an ID of an access network node to which the cell belongs, etc. A Cell in the configuration list is a cell that needs to be monitored and uses the satellite backhaul. The cell, for convenience of distinction, is referred to as the first cell here.

In the embodiment, the configuration list may be configured in a PCF network element, the SMF network element, or an AMF network element. Or the configuration list may be configured in all of the PCF network element, the SMF network element, and the AMF network element.

In some embodiments of the present disclosure, in response to the AMF network element being configured with the specified configuration list, the fourth determining module 1710 is configured to: determine information of the second cell where the terminal is currently located; and determine the satellite backhaul information currently corresponding to the terminal based on information of a first cell in a specified configuration list and the information of the second cell; in which information of a cell includes any of the following information: an identification (ID) of the cell, and an ID of an access network node to which the cell belongs.

In some embodiments of the present disclosure, as shown in FIG. 18, the apparatus 1700 further includes: a sixth sending module 1720, configured to in response to an update to the satellite backhaul information currently corresponding to the terminal, send a satellite backhaul information updating message to an SMF network element.

In some embodiments of the present disclosure, the apparatus further includes: a seventh sending module, configured to in response to the satellite backhaul being currently used by the terminal, send the satellite backhaul information to an SMF network element.

In some embodiments of the present disclosure, as shown in FIG. 19, the apparatus 1700 further includes:

a second obtaining module 1730, configured to obtain a subscribe request for the satellite backhaul information sent by an SMF network element, in which the subscribe request includes information of a cell using the satellite backhaul to be monitored; and an eighth sending module 1740, configured to, in response to any terminal enters or leaves the cell using the satellite backhaul to be monitored, send updated satellite backhaul information to the SMF network element.

In the embodiment of the present disclosure, by determining the satellite backhaul information currently corresponding to the terminal, the PCF network element can configure a corresponding QoS identifier for the terminal according to the satellite backhaul information currently corresponding to the terminal, so that the corresponding QoS identifier can be configured for the terminal according to the location of the terminal, thus meeting the terminal's requirements for the same business in different geographical areas.

According to an embodiment of the disclosure, a communication device and a computer storage medium are provided.

Figure 20:
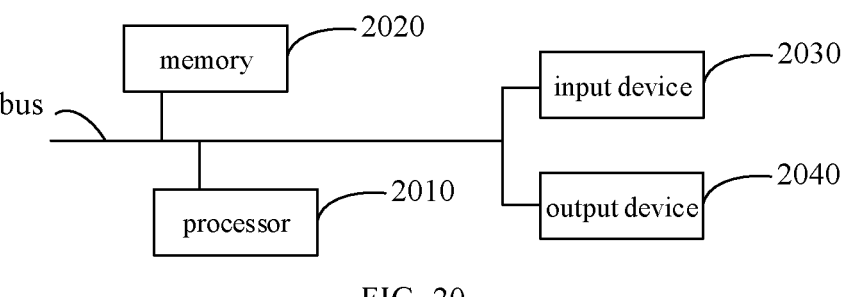
FIG. 20 is a block diagram of a communication device according to an embodiment of the present disclosure.

As shown in FIG. 20, it is a block diagram of a device for determining satellite backhaul information according to an embodiment of the present disclosure. The communication device is intended to represent various forms of digital computers, such as a laptop computer, a desktop computer, a workstation, a personal digital assistant, servers, a blade server, a mainframe computer, and other suitable computers. The communication device may also represent various forms of mobile devices, such as a personal digital processor, a cellular phone, a smart phone, a wearable device, and other similar computing devices. The components, their connections and relationships, and their functions shown herein are by way of example only, and are not intended to limit implementations of the disclosure described and/or claimed herein.

As shown in FIG. 20, the communication device includes: one or more processors 2010, a memory 2020, and interfaces for connecting various components, including a high-speed interface and a low-speed interface. The various components are interconnected using different buses and may be mounted on a common motherboard or otherwise as desired. The processor may process instructions executed within the communication device, including instructions stored in memory or instructions stored in the memory to display graphical information of the GUI on an external input/output device (such as a display device coupled to the interface). In other embodiments, multiple processors and/or multiple buses may be used with multiple memories, if desired. Likewise, multiple communication devices may be connected, with each device providing some of the necessary operations (e.g., as a server array, a group of blade servers, or a multi-processor system). In FIG. 20, one processor 2010 is used as an example.

The memory 2020 is the non-transitory computer-readable storage medium provided by the present disclosure. The memory stores instructions executable by at least one processor, so that the at least one processor executes the method for determining satellite backhaul information provided by the present disclosure. The non-transitory computer-readable storage medium of the present disclosure stores computer instructions for causing a computer to perform the method for determining satellite backhaul information provided by the present disclosure.

As a non-transitory computer-readable storage medium, the memory 2020 can be used to store non-transitory software programs, non-transitory computer-executable programs, and modules, such as program instructions/modules corresponding to the method for determining satellite backhaul information in the embodiments of the present disclosure (for example, the first determining module 1110 shown in FIG. 11, or the third determining module 1410 shown in FIG. 14, or the fourth determining module 1710 shown in FIG. 17). The processor 2010 executes various functional applications and data processing of the server by running the non-transitory software programs, instructions and modules stored in the memory 2020, i.e., implementing the method for determining satellite backhaul information in the above method embodiments.

The memory 2020 may include a storage program area and a storage data area, the storage program area may store an operating system, an application program required for at least one function; the storage data area may store data created according to the use of the positioning communication device, and the like. Additionally, the memory 2020 may include a high-speed random access memory, and may also include a non-transitory memory, such as at least one magnetic disk storage device, a flash memory device, or other non-transitory solid-state storage devices. Optionally, the memory 2020 may optionally include a memory located remotely from processor 2010, and these remote memories may be connected to the positioning communication device via a network. Examples of such networks include, but are not limited to, the internet, an intranet, a local area network, a mobile communication network, and combinations thereof.

The communication device for determining satellite backhaul information may further include: an input device 2030 and an output device 2040. The processor 2010, the memory 2020, the input device 2030, and the output device 2040 may be connected through a bus or in other ways, and the connection through a bus is taken as an example in FIG. 20.

The input device 2030 may receive input numerical or character information and generate a key signal input related to user settings and functional control of the positioning communication device, such as a touch screen, a keypad, a mouse, a trackpad, a touchpad, a pointing stick, one or more mouse buttons, trackballs, joysticks, or other input devices. The output device 2040 may include a display device, an auxiliary lighting device (e.g., LED), and a haptic feedback device (e.g., vibration motor), and the like. The display device may include, but is not limited to, a liquid crystal display (LCD), a light emitting diode (LED) display, and a plasma display. In some implementations, the display device may be a touch screen.

Various implementations of the system and technique described herein can be implemented in a digital electronic circuitry, an integrated circuit system, an application specific ASIC (application specific integrated circuit), computer hardware, firmware, software, and/or a combination thereof. These various embodiments may include being implemented in one or more computer programs executable and/or interpretable on a programmable system including at least one programmable processor, which may be a special purpose or general-purpose programmable processor, may receive data and instructions from a storage system, at least one input device, and at least one output device, and transmit data and instructions to the storage system, the at least one input device, and the at least one output device.

These computational programs (also referred to as programs, software, software applications, or codes) include machine instructions for programmable processors, and may be implemented using high-level procedural and/or object-oriented programming languages, and/or assembly/machine languages. As used herein, the terms "machine-readable medium" and "computer-readable medium" refer to any computer program product, device, and/or apparatus (for example, a magnetic disk, an optical disk, a memory, a programmable logic device (PLD)) for providing machine instructions and/or data to a programmable processor, including machine-readable media that receive machine instructions as machine-readable signals. The term "machine-readable signal" refers to any signal used to provide machine instructions and/or data to a programmable processor.

To provide interaction with a user, the system and technique described herein may be implemented on a computer having a display device (e.g., CRT (cathode ray tube) or LCD (liquid crystal display) monitor) for displaying information to the user; and a keyboard and pointing device (e.g., mouse or trackball) through which the user can provide input to the computer. Other kinds of devices can also be used to provide interaction with the user; for example, the feedback provided to the user can be any form of sensory feedback (e.g., visual feedback, auditory feedback, or tactile feedback); and can be in any form (including acoustic input, voice input, or tactile input) to receive input from the user.

The system and technique described herein may be implemented on a computing system that includes back-end components (e.g., as a data server), or a computing system that includes middleware components (e.g., an application server), or a computing system that includes front-end components (e.g., a user computer having a graphical user interface or web browser through which a user may interact with implementations of the system and technique described herein), or a computing system that includes any combination of such backend components, middleware components, or front-end components. The components of the system may be interconnected by any form or medium of digital data communication (e.g., communication network). Examples of communication networks include: Local Area Networks (LANs), Wide Area Networks (WANs), and the Internet.

A computer system can include a clients and a server. The client and the server are generally remote from each other and usually interact through a communication network. The relationship of the client and the server arises by virtue of computer programs running on the respective computers and having a client-server relationship with each other.

According to the apparatus for determining satellite backhaul information of the embodiment of the present disclosure, by determining the satellite backhaul information currently corresponding to the terminal, it is convenient to configure a corresponding QoS identifier for the terminal according to the satellite backhaul information currently corresponding to the terminal, so that the corresponding QoS identifier can be configured for the terminal according to the location of the terminal, thus meeting the terminal's requirements for the same business in different geographical areas.

It should be understood that steps may be reordered, added or deleted using various forms of flows shown above. For example, the steps described in the present disclosure can be executed in parallel, sequentially, or in different orders, as long as the desired results of the technical solutions disclosed in the present disclosure can be achieved, which is not limited herein.

The above-mentioned specific embodiments do not constitute a limitation on the protection scope of the present disclosure. It should be understood by those skilled in the art that various modifications, combinations, sub-combinations and substitutions may occur depending on design requirements and other factors. Any modifications, equivalent replacements, and improvements made within the spirit and principles of the present disclosure should be included within the protection scope of the present disclosure.

What is claimed is:

1. A method for determining satellite backhaul information, performed by a policy control function (PCF) network element, comprising:

determining the satellite backhaul information corresponding to a terminal;

wherein the satellite backhaul information comprises any of: information of whether the terminal is using a satellite backhaul, information of whether a network type of the satellite backhaul used by the terminal is changed, information of whether the terminal is located within a first cell; wherein the first cell is a cell supporting the satellite backhaul, the terminal is located within a second cell, and whether the terminal is using the satellite backhaul depends on the second cell;

wherein determining the satellite backhaul information corresponding to the terminal comprises:

determining information of the second cell; and determining the satellite backhaul information based on information of a first cell in a configuration list and the information of the second cell;

wherein the information of the first cell comprises any of: an identification (ID) of the first cell, and an ID of an access network node to which the first cell belongs, and the information of the second cell comprises any of: an identification (ID) of the second cell, and an ID of an access network node to which the second cell belongs;

the method further comprising:

sending a subscribe request for the satellite backhaul information to a session management function (SMF) network element, wherein the subscribe request comprises any of: the information of whether the terminal is using the satellite backhaul, the information of whether the network type of the satellite backhaul used by the terminal is changed, the information of whether the terminal is located within the first cell, and the subscribe request further comprises information of a cell using the satellite backhaul to be monitored;

receiving response information from the SMF network element, wherein the response information is information responding to the subscribe request; and determining the satellite backhaul information based on the response information.

2. The method according to claim 1, wherein determining the satellite backhaul information corresponding to the terminal comprises:

in response to not obtaining satellite backhaul information returned by the SMF network element, determining the satellite backhaul information corresponding to the terminal.

3. The method according to claim 1, further comprising at least one of:

determining a first quality of service (QoS) identifier corresponding to the terminal, wherein the satellite backhaul information indicating that the second cell is using the satellite backhaul;

determining a second quality of service (QoS) identifier corresponding to the terminal, wherein the satellite backhaul information indicating that the second cell is not using the satellite backhaul;

wherein, a packet delay budget (PDB) corresponding to the first QoS identifier is greater than a PDB corresponding to the second QoS identifier.

4. A communication device, comprising: a transceiver; a memory; a processor connected respectively to the transceiver and the memory, configured to execute computer executable instructions on the memory to control the transceiver to transmit and receive wireless signals and to perform the method according to claim 1.

5. A non-transitory computer storage medium having computer executable instructions stored thereon, wherein when the computer executable instructions are executed by a processor, the method according to claim 1 is implemented.

6. A method for determining satellite backhaul information, performed by a session management function (SMF) network element, comprising:

determining the satellite backhaul information corresponding to a terminal;

wherein the satellite backhaul information comprises any of: information of whether the terminal is using a satellite backhaul, information of whether a network type of the satellite backhaul used by the terminal is changed, information of whether the terminal is located within a first cell; wherein the first cell is a cell supporting the satellite backhaul, the terminal is located within a second cell, and whether the terminal is using the satellite backhaul depends on the second cell;

wherein determining the satellite backhaul information corresponding to the terminal comprises:

determining information of the second cell; and determining the satellite backhaul information based on information of a first cell in a configuration list and the information of the second cell;

wherein the information of the first cell comprises any of: an identification (ID) of the first cell, and an ID of an access network node to which the first cell belongs, and the information of the second cell comprises any of: an identification (ID) of the second cell, and an ID of an access network node to which the second cell belongs;

the method further comprising:

sending a subscribe request for the satellite backhaul information to an access and mobility management function (AMF) network element, wherein the subscribe request comprises any of: the information of whether the terminal is using the satellite backhaul, the information of whether the network type of the satellite backhaul used by the terminal is changed, the information of whether the terminal is located within the first cell, and the subscribe request further comprises information of a cell using the satellite backhaul to be monitored;

receiving response information from the AMF network element, wherein the response information is information responding to the subscribe request; and determining the satellite backhaul information based on the response information.

7. The method according to claim 6, wherein determining the satellite backhaul information corresponding to the terminal comprises:

in response to not obtaining satellite backhaul information returned by the AMF network element, determining the satellite backhaul information corresponding to the terminal.

8. The method according to claim 6, further comprising:

in response to the satellite backhaul being used by the terminal, sending the satellite backhaul information to a policy control function (PCF) network element.

9. The method according to claim 6, further comprising:

in response to an update to the satellite backhaul information, sending updated satellite backhaul information to a PCF network element.

10. The method according to claim 6, further comprising:

obtaining a subscribe request for the satellite backhaul information sent by a PCF network element, wherein the subscribe request comprises information of a cell using the satellite backhaul to be monitored; and in response to any terminal enters or leaves the cell using the satellite backhaul to be monitored, sending updated satellite backhaul information to the PCF network element.

11. A method for determining satellite backhaul information, performed by an access and mobility management function (AMF) network element, comprising:

determining the satellite backhaul information corresponding to a terminal;

wherein the satellite backhaul information comprises any of: information of whether the terminal is using a satellite backhaul, information of whether a network type of the satellite backhaul used by the terminal is changed, information of whether the terminal is located within a first cell; wherein the first cell is a cell supporting the satellite backhaul, the terminal is located within a second cell, and whether the terminal is using the satellite backhaul depends on the second cell;

the method further comprising:

obtaining a subscribe request for the satellite backhaul information sent by an SMF network element, wherein the subscribe request comprises any of: the information of whether the terminal is using the satellite backhaul, the information of whether the network type of the satellite backhaul used by the terminal is changed, the information of whether the terminal is located within the first cell, and the subscribe request further comprises information of a cell using the satellite backhaul to be monitored; and in response to any terminal enters or leaves the cell using the satellite backhaul to be monitored, sending updated satellite backhaul information to the SMF network element.

12. The method according to claim 11, wherein determining the satellite backhaul information corresponding to the terminal comprises:

determining information of the second cell; and determining the satellite backhaul information based on information of a first cell in a configuration list and the information of the second cell;

wherein the information of the first cell comprises any of: an identification (ID) of the first cell, and an ID of an access network node to which the first cell belongs, and the information of the second cell comprises any of: an identification (ID) of the second cell, and an ID of an access network node to which the second cell belongs.

13. The method according to claim 11, further comprising:

in response to an update to the satellite backhaul information, sending a satellite backhaul information updating message to a session management function (SMF) network element.

14. The method according to claim 11, further comprising:

in response to the satellite backhaul being used by the terminal, sending the satellite backhaul information to an SMF network element.

\* \* \* \* \*